United States Patent [19]
Smith

[11] 3,742,755
[45] July 3, 1973

[54] ELECTRICAL INSULATION THERMAL SOFTENING DETECTION DEVICE

[75] Inventor: Hugh B. Smith, Midland, Mich.

[73] Assignee: The Dow Chemical Company, Midland, Mich.

[22] Filed: July 2, 1971

[21] Appl. No.: 159,430

[52] U.S. Cl. .................. 73/15 R, 73/81, 324/54
[51] Int. Cl. ........................................ G01n 25/00
[58] Field of Search................... 73/15, 15.6, 17, 73/81; 324/54

[56] References Cited
UNITED STATES PATENTS

| | | | |
|---|---|---|---|
| 3,150,523 | 9/1964 | Papsis | 324/54 |
| 3,289,460 | 12/1966 | Anderson | 73/17 |
| 3,580,047 | 5/1971 | Simpson | 73/17 |
| 3,208,271 | 9/1965 | Thompson | 73/81 |
| 3,187,556 | 6/1965 | Ehlers | 73/17 |

*Primary Examiner*—Herbert Goldstein
*Attorney*—Robert W. Selby et al.

[57] ABSTRACT

A device to measure the thermal softening point of electrical insulating coatings on electric conducting members is described. The device includes an electrically conducting body, a cutting edge electrically attached to the body, an electric source and current sensing means in series with the insulated conducting test member. A weight is attached to one end of the test member to transmit a force to the test member and downwardly against the cutting edge. The sensing means is suited to respond when the cutting edge severs the insulation at the softening temperature; the heat being provided by a regulatable heating means.

4 Claims, 2 Drawing Figures

PATENTED JUL 3 1973
3,742,755
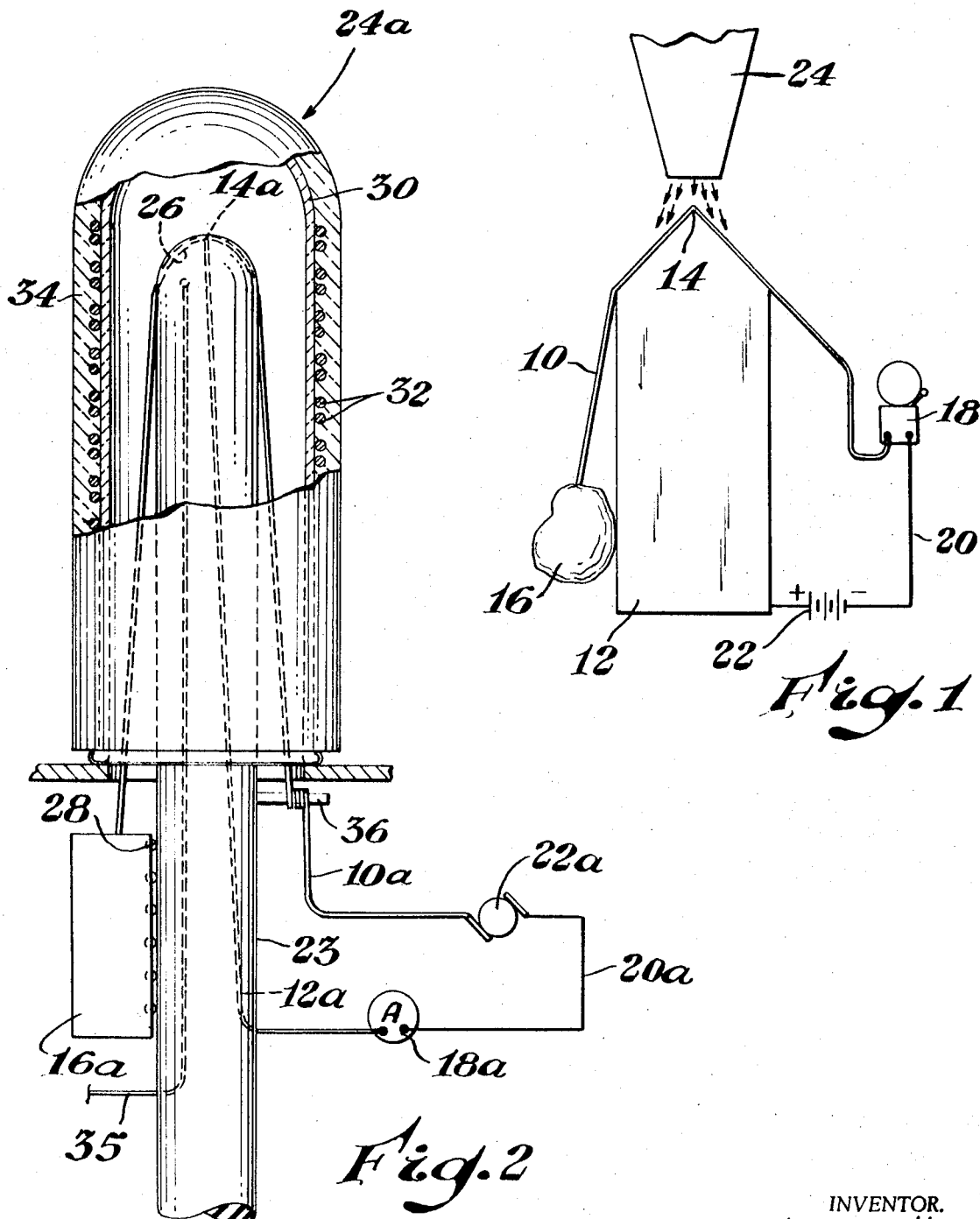
INVENTOR.
Hugh B. Smith
BY Robert W. Selby
ATTORNEY

ELECTRICAL INSULATION THERMAL SOFTENING DETECTION DEVICE

BACKGROUND OF THE INVENTION

This invention relates to a device for detecting softening of electrical insulation and more in particular the determination of the temperature at which electrical insulation softens.

Oftentimes it is desirable or necessary to employ insulated electrical wiring in environments having a temperature in excess of ambient. It is highly desirable that the electrical conductor utilized for this purpose has an insulation compatible with the temperatures of the environment. A means to rapidly and easily determine the softening point of electrical insulation is needed.

It is an object of this invention to provide a device to determine the temperature at which electrical insulation softens.

It is another object of this invention to provide a device to rapidly and accurately determine the thermal softening point of insulation on electrical conductors.

Other objects and advantages of this invention will become apparent during the course of the following discussion.

SUMMARY OF THE INVENTION

It has been found that the softening temperature of electrical insulation can be determined and the beforementioned objects and advantages achieved in hereinafter described device. The device for measuring the thermal softening point of electrical insulating coatings on an elongated electrically conducting member having a first and a second end comprises a body with a cutting edge electrically attached to said body. The body is suitable to conduct electrical current from the cutting edge to an electrical sensing means. The cutting edge is of a configuration suitable to sever the electrical insulation at the thermal softening point of the insulation. A weight, characterized by being electrically insulated to prevent electric current flow from the body to the conducting member, is adapted to be removably mechanically attached to the first end of the conducting member. The weight causes a force to be simultaneously uniformly exerted in a downwardly direction on both the conducting member and the cutting edge. An electric source is attached in electrical series with the body. The electric sensing means, adapted to respond to electric current passing through the conducting member, cutting edge and body from the electric source, is removably electrically attached in series with the body at the second end of the conducting member.

The device also includes a means to regulatably heat the insulated conducting member to at least the softening temperature of the electrical insulation. The heating means is suited to regulatably increase the temperature of the insulation, at least at the cutting edge, to at least the softening temperature. When the softening temperature is attained, the cutting edge severs the insulating coating on the conducting member sufficiently to produce electrical contact between the conducting member and the cutting edge. Flow of electric current through the so-formed continuous circuit actuates the electric sensing means permitting the softening temperature to be accurately determined.

DESCRIPTION OF THE DRAWINGS

The accompanying drawings further illustrate the invention;

FIG. 1 is a side view of the thermal softening detection device;

FIG. 2 is a side view of a preferred embodiment of the thermal softening detection device.

Identical numerals, distinguished by a letter suffix, within the several figures represent parts having a similar function within the different embodiments.

DESCRIPTION OF THE PREFERRED EMBODIMENTS

In FIG. 1 is depicted a basic device for determining the softening temperature of electrical insulation on an elongated electrically conducting member or wire 10 having a first and a second end. The device comprises a body 12 suitable to conduct electric current and withstand the test temperatures without being deleteriously affected. The body 12 can be a solid or at least partially hollow block of a metal alloy, such as aluminum or copper, or other electrical conducting material, capable of withstanding the environmental testing conditions. A cutting edge 14 is integral with the body 12; however, the cutting edge 14 need only be electrically connected to said body and be effectively heat stable at the test temperatures. A weight 16 is preferably removably attached to the first end of the wire 10. The means employed to attach the wire 10 to the weight 16 is not critical and can be tying, clamping, bolting and the like. The weight 16 is of a suitable electric insulating material or is insulated from the body 12 and/or the wire 10 to prevent sufficient flow of electricity from the body 12 through the weight 16 and the wire 10 to actuate an electric sensing means such as an ammeter, voltmeter, light or bell 18. The bell 18 is removably attached to a second end of the wire 10 and to a jumper connector 20. Connector 20 is desirably removably attached in series to both the bell 18 and an electric source such as an AC or DC generator, commercially produced AC current, or a DC battery 22. The connector 20 is of a material suitable to conduct electricity; such as copper or aluminum wire, cable, bus bar, and the like. The specific position sequence of the bell 18, connector 20 and battery 22 is not critical as long as they are in electrical series with the wire 10, body 12 and cutting edge 14.

A regulatable heating means such as an electrical heating element, flame, or a hot air blower 24 is positioned in cooperative combination with the cutting edge 14. Such heating means are known to those skilled in the art and can be external and/or internal to the cutting edge 14 and/or body 12.

In operation, the second end of the wire 10 is removably attached to the bell 18 by, for example, a standard electrical screw. The wire 10 is supportingly positioned over the cutting edge 14. The first end of the wire 10 is then preferably removably attached to the weight 16. The wire 10, bell 18, jumper connector 20, battery 22, body 12 and cutting edge 14 are in electrical series. However, the insulation on the wire 10 prevents electrical contact between wire 10 and cutting edge 14 and, consequently, electric current is prevented from passing through the aforementioned electrical series circuit.

The hot air blower 24 is positioned adjacent to the cutting edge 14 and the wire 10 so that heated air passes over and heats the wire 10 at least at the point at which it is supported by the cutting edge 14. The temperature of the air is gradually and regulatably increased until the softening temperature of the insulation coating on the wire 10 is attained. As the temperature approaches the insulation softening point, the weight 16, through the wire 10, exerts a downwardly directed force on the wire 10 against the stationary cutting edge 14. As the insulation coating on the wire 10 softens, the cutting edge 14 cuts or severs the insulation coating sufficiently to produce electrical contact between the wire 10 and the cutting edge 14. Upon electrical contact between the wire 10 and the cutting edge 14, electric current passes through the closed loop series circuit from the battery 22 through the body 12, cutting edge 14 and wire 10 to cause the bell 18 to respond to the current and emit a sound. Upon actuation of the bell 18, the temperature of the regulatably heated air and, therefore, the softening temperature of the insulation on the wire 10 can be readily determined by methods known to those skilled in the art. Usually the weight employed is uniform from test to test to facilitate accurate comparison of the various softening temperature test results.

FIG. 2 is illustrative of another embodiment of the device comprising a body 12a, such as a bare or insulated electrically conductive wire. Preferably the body 12a is at least partially, permanently or removably, positioned within an electrically insulating body covering 23. The body covering 23 is of a material substantially stable at the test conditions, that is, the body covering 23 is not detrimentally physically or chemically altered by the test conditions. Examples of suitable body coverings are glass, thermosetting plastics such as phenol-aldehyde, quartz and the like. A cutting edge 14a is of a material suitable to cut or sever at least part of the insulation on the conducting member or a wire 10a. The cutting edge 14a can be attached electrically to the body 12a or, as herein depicted, can be a part of the body 12a. For ease of positioning the wire 10a in physical contact with the cutting edge 14a, at least one wire positioning means, such as a groove 26, is defined by the body covering 23 adjacent to the cutting edge 14a. An electrical sensing means, such as an automatic recording ammeter 18a, is electrically attached by a jumper connector 20a in series with an electric source, such as a generator 22a. The wire 10a, having a first end and a second end, is attached at the first end to a weight 16a. The weight 16a is of any material such as wood, ceramic, metal and the like. It is only necessary that electricity not flow from the body 12a to the wire 10a through the weight 16a; this is readily accomplished by means known to those skilled in the art. Optionally a sliding means, such as ball bearings 28, can be supportably positioned within the weight 16a and/or body covering 23 to minimize friction between the weight 16a and the body covering 23 when the weight 16a exerts a downwardly directed force upon the wire 10a.

A regulatable heating means 24a is positioned at least adjacent to the junction of the wire 10a and the cutting edge 14a. Preferably the cutting edge 14a is disposed within the heating means 24a. The heating means 24a comprises a heat container 30 of a heat stable material, such as a ceramic or metal, supportably positioned in a spaced apart, at least partially incasing relation with the junction. The heat container 30 is suited to transmit heat to the junction. A heating element, such as an electric unit 32, is externally disposed adjacent to a wall portion of the container 30 to introduce heat to the junction. To retard or prevent excessive heat loss from within the container 30 a thermally insulating coating 34 can, optionally, cover or enclose substantially all the exterior of the electric unit 32 and the outer wall portions of the container 30. Such insulating coating 34 can be, for example, asbestos, ceramic foam or a heat reflecting shield as an aluminum sleeve. A thermocouple 35 is position within the body covering 23 adjacent to the cutting edge 14a. A thermocouple 35 continuously measures the temperature at about the point of physical contact between wire 10a and cutting edge 14a, hereinafter referred to as "the junction." An automatically recording temperature instrument can optionally be electrically attached to the thermocouple 35.

In operation, the first end of the wire 10a is physically connected to the weight 16a, positioned within the groove 26, removably attached to a wire retainer 36, and removably attached to the generator 22a. The heating means 24a is then surroundingly placed over the wire 10a, cutting edge 14a and body 12a. The electric unit 32 is removably attached to a commercially available electric source external to the device and controllably heated to regulatably increase the temperature at the junction to the softening temperature of the insulation on wire 10a.

When the temperature at the junction attains the wire insulation softening point the cutting edge 14a severs the insulation and electrically contacts the wire 10a, creating a continuous series circuit through the body 12a and the wire 10a to the recording ammeter 18a. The temperature at the junction when the ammeter indicates a current passing through the circuit can be readily determined from the thermocouple 35 by well-known means. This temperature represents the softening point of the insulation coating on the wire 10a.

As is apparent from the foregoing specification, the device of the present invention is susceptible of being embodied with various alterations and modifications, which may differ from those described in the preceding description. For this reason, it is to be fully understood that all of the foregoing is intended to be illustrative and not to be construed or interpreted as being restrictive or otherwise limiting the present invention.

I claim:

1. A device for measuring the thermal softening point of electrical insulating coatings on an elongated electrically conducting member with two ends comprising:
    an upwardly disposed, elongated body suitable to conduct electric current;
    a stationary cutting edge electrically attached to said body, said cutting edge being of a configuration suitable to sever the insulation at the thermal softening point of the insulation;
    an electrically insulating body covering positioned adjacently around said body;
    a conducting member positioning means defined by said body covering adapted to position the conducting member in physical contact with said cutting edge;
    a thermocouple suitably positioned within the body covering to detect the temperature at about said cutting edge;

a weight adapted to be removably mechanically attached to a first end of the conducting member to uniformly exert a downwardly directed force on the conducting member and against said cutting edge, said weight adapted to slidably move on a surface of said body covering;

an electric source attached in electrical series with said body;

an electric sensing means removably electrically attached in series to a second end of the conducting member and to said body to respond to electric current passing through the conducting member and said body from said electric source;

a means to regulatably heat the conducting member to at least the softening temperature whereby the insulation softens at said cutting edge and severs sufficiently to cause electrical contact between the conducting member and said body.

2. The device of claim 1 wherein said body is a wire.

3. The device of claim 1 wherein said heating means includes a thermocouple positioned within said body cover.

4. The device of claim 1 wherein said cutting edge is disposed within said regulatable heating means, said heating means comprising a heat resistant and heat transmitting container, an electric heating element externally disposed adjacent to a wall portion of said container, and a thermally insulating coating surrounding substantially all the outer wall portions of said container and said heating element to retard heat flow from within said container and said cutting edge.

* * * * *